United States Patent
Lewis et al.

(10) Patent No.: US 12,093,320 B2
(45) Date of Patent: Sep. 17, 2024

(54) SYSTEMS, METHODS, AND APPARATUSES FOR PROVIDING ASSISTANT DEEP LINKS TO EFFECTUATE THIRD-PARTY DIALOG SESSION TRANSFERS

(71) Applicant: GOOGLE LLC, Mountain View, CA (US)

(72) Inventors: Justin Lewis, Marina Del Rey, CA (US); Scott Davies, Santa Monica, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/380,545

(22) Filed: Oct. 16, 2023

(65) Prior Publication Data

US 2024/0045909 A1 Feb. 8, 2024

Related U.S. Application Data

(63) Continuation of application No. 18/094,525, filed on Jan. 9, 2023, now Pat. No. 11,790,004, which is a
(Continued)

(51) Int. Cl.
G06F 16/9032 (2019.01)
G06F 16/955 (2019.01)
(Continued)

(52) U.S. Cl.
CPC .... G06F 16/90332 (2019.01); G06F 16/9558 (2019.01); G10L 15/26 (2013.01); G10L 15/30 (2013.01); G10L 15/32 (2013.01)

(58) Field of Classification Search
USPC .................................................... 704/1–504
See application file for complete search history.

(56) References Cited

U.S. PATENT DOCUMENTS 6,934,756 B2   8/2005   Maes
7,529,675 B2   5/2009   Maes
(Continued)

FOREIGN PATENT DOCUMENTS

CN   1638338   7/2005
CN   101207656   6/2008
(Continued)

OTHER PUBLICATIONS

China National Intellectual Property Administration; Notification of First Office Action issued in Application No. 201980012631.6; 34 pages; dated Feb. 27, 2023.
(Continued)

*Primary Examiner* — Marcus T Riley
(74) *Attorney, Agent, or Firm* — Gray Ice Higdon

(57) ABSTRACT

Methods, apparatus, systems, and computer-readable media are provided for transferring dialog sessions between devices using deep links. The dialog sessions can correspond to interactions, mediated by an automated assistant, between a user and a third party application. During the dialog session, a user can request that the dialog session be transferred to a different device, for example, to interact with the third party application through a different modality. In response, the automated assistant and/or the third party application can generate a link that can be transferred to the transferee device to allow the transferee device to seamlessly take over the dialog session. In this way, computational resources and electrical power can be preserved by not requiring a recipient device to re-process natural language inputs previously provided during the dialog session.

15 Claims, 5 Drawing Sheets

Related U.S. Application Data continuation of application No. 17/322,779, filed on May 17, 2021, now Pat. No. 11,550,846, which is a continuation of application No. 16/329,060, filed as application No. PCT/US2019/013657 on Jan. 15, 2019, now Pat. No. 11,010,428.

(60) Provisional application No. 62/617,796, filed on Jan. 16, 2018.

(51) Int. Cl.
   *G10L 15/26* (2006.01)
   *G10L 15/30* (2013.01)
   *G10L 15/32* (2013.01)

(56) References Cited

U.S. PATENT DOCUMENTS

| | | | |
|---|---|---|---|
| 7,711,570 | B2 | 5/2010 | Galanes et al. |
| 7,725,307 | B2 | 5/2010 | Bennett |
| 8,311,835 | B2 | 11/2012 | Lecoeuche |
| 8,346,563 | B1 | 1/2013 | Hjelm et al. |
| 8,594,305 | B2 | 11/2013 | Da Palma et al. |
| 8,892,419 | B2 | 11/2014 | Lundberg et al. |
| 8,903,711 | B2 | 12/2014 | Lundberg et al. |
| 8,990,068 | B2 | 3/2015 | Orsini et al. |
| 8,996,352 | B2 | 3/2015 | Orsini et al. |
| 8,996,353 | B2 | 3/2015 | Orsini et al. |
| 8,996,355 | B2 | 3/2015 | Orsini et al. |
| 9,031,829 | B2 | 5/2015 | Leydon et al. |
| 9,280,610 | B2 | 3/2016 | Gruber et al. |
| 9,633,674 | B2 | 4/2017 | Sinha |
| 9,767,520 | B2 | 9/2017 | Isaacson et al. |
| 9,858,925 | B2 | 1/2018 | Gruber et al. |
| 9,881,007 | B2 | 1/2018 | Orsini et al. |
| 9,922,380 | B2 | 3/2018 | Isaacson et al. |
| 9,922,381 | B2 | 3/2018 | Isaacson et al. |
| 9,953,088 | B2 | 4/2018 | Gruber et al. |
| 10,121,186 | B2 | 11/2018 | Isaacson et al. |
| 10,176,808 | B1 * | 1/2019 | Lovitt .................... G06N 3/042 |
| 10,204,099 | B2 | 2/2019 | Orsini et al. |
| 10,276,170 | B2 * | 4/2019 | Gruber .................... G06F 3/167 |
| 10,475,446 | B2 | 11/2019 | Gruber et al. |
| 10,504,193 | B2 | 12/2019 | Isaacson et al. |
| 10,614,171 | B2 | 4/2020 | Orsini et al. |
| 10,621,653 | B2 | 4/2020 | Isaacson et al. |
| 10,741,185 | B2 * | 8/2020 | Gruber ............... G06F 16/2457 |
| 10,782,986 | B2 | 9/2020 | Martin |
| 10,884,503 | B2 | 1/2021 | Divakaran |
| 10,977,452 | B2 | 4/2021 | Wang |
| 11,010,428 | B2 | 5/2021 | Lewis et al. |
| 11,256,390 | B2 * | 2/2022 | Ni .......................... H04L 67/51 |
| 11,314,944 | B2 | 4/2022 | Lewis et al. |
| 11,347,376 | B2 | 5/2022 | Pufahl et al. |
| 11,526,368 | B2 * | 12/2022 | Karashchuk ......... G06Q 10/109 |
| 11,550,846 | B2 | 1/2023 | Lewis |
| 11,579,749 | B2 * | 2/2023 | Ni ........................ H04L 12/282 |
| 11,693,533 | B2 * | 7/2023 | Ni ...................... G06F 3/04812 |
| | | | 704/275 |
| 2002/0184373 | A1 | 12/2002 | Maes |
| 2004/0039636 | A1 | 2/2004 | Feldes |
| 2005/0125232 | A1 | 6/2005 | Gadd |
| 2006/0041431 | A1 | 2/2006 | Maes |
| 2008/0147407 | A1 | 6/2008 | Da Palma et al. |
| 2013/0185081 | A1 * | 7/2013 | Cheyer ............... G06F 16/3329 |
| | | | 704/275 |
| 2013/0268260 | A1 * | 10/2013 | Lundberg ............ G06F 11/3664 |
| | | | 704/8 |
| 2013/0275164 | A1 * | 10/2013 | Gruber .................... G10L 17/22 |
| | | | 705/5 |
| 2014/0019116 | A1 | 1/2014 | Lundberg et al. |
| 2014/0245140 | A1 | 8/2014 | Brown et al. |
| 2015/0149182 | A1 | 5/2015 | Kalns et al. |
| 2015/0156061 | A1 | 6/2015 | Saxena et al. |
| 2015/0179170 | A1 | 6/2015 | Sarikaya et al. |
| 2016/0171979 | A1 | 6/2016 | Breazeal |
| 2016/0261647 | A1 | 9/2016 | Yerli |
| 2017/0116982 | A1 | 4/2017 | Gelfenbeyn et al. |
| 2017/0344256 | A1 | 11/2017 | Gnedin et al. |
| 2018/0314689 | A1 | 11/2018 | Wang et al. |
| 2018/0366118 | A1 * | 12/2018 | Lovitt .................... G10L 15/063 |
| 2019/0214024 | A1 * | 7/2019 | Gruber ............... G06F 16/2457 |
| 2019/0332680 | A1 | 10/2019 | Wang |
| 2020/0110515 | A1 | 4/2020 | Pufahl |
| 2020/0327169 | A1 | 10/2020 | Lewis et al. |
| 2020/0327895 | A1 * | 10/2020 | Gruber .................... G10L 17/22 |
| 2021/0118442 | A1 | 4/2021 | Poddar |
| 2021/0271714 | A1 | 9/2021 | Lewis et al. |
| 2022/0157300 | A1 | 5/2022 | Sharifi |
| 2022/0215181 | A1 | 7/2022 | Lewis et al. |
| 2023/0161820 | A1 | 5/2023 | Lewis |
| 2023/0297214 | A1 * | 9/2023 | Ni ........................ H04L 12/282 |
| | | | 704/275 |
| 2024/0045909 | A1 * | 2/2024 | Lewis .................... G10L 15/32 |

FOREIGN PATENT DOCUMENTS

| | | |
|---|---|---|
| CN | 104796313 | 7/2015 |
| CN | 105264864 | 1/2016 |
| CN | 107395485 | 11/2017 |
| CN | 107431708 | 12/2017 |
| WO | 2015084554 | 6/2015 |

OTHER PUBLICATIONS

European Patent Office; Communication—European Extended Search Report issued in Application No. 22189891.9, 8 pages, dated Nov. 28, 2022.

European Patent Office; Intention to Grant issued in Application No. 19704479.5, 36 pages, dated Nov. 17, 2021.

European Patent Office; International Search Report and Written Opinion of Ser. No. PCT/US2019/013657; 14 pages; dated Apr. 25, 2019.

European Patent Office; Intention to Grant issued in Application No. 19704479.5, 36 pages, dated Apr. 20, 2022.

European Patent Office, Intention to Grant issued in Application No. 22189891.9, 37 pages, dated Jan. 16, 2024.

China National Intellectual Property Administration; Grant Notice issued in Application No. 201980012631.6; 4 pages; dated Jan. 10, 2024.

China National Intellectual Property Administration; Notification of Office Action issued in Application No. 201980012631.6; 13 pages; dated Nov. 14, 2023.

\* cited by examiner

SYSTEMS, METHODS, AND APPARATUSES FOR PROVIDING ASSISTANT DEEP LINKS TO EFFECTUATE THIRD-PARTY DIALOG SESSION TRANSFERS

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e. utterances) which may in some cases be converted into text and then processed, and/or by providing textual (e.g., typed) natural language input. Some automated assistants can mediate dialog sessions between a user and a third party application, thereby allowing the automated assistants to act as a consistent medium through which the user can interface with various applications. However, because not all computing devices have the same types of interfaces, such dialog sessions can be limited when, for example, a computing device does not have a display panel. Under such circumstances, computational resources and on-device power resources can be wasted when a third party application attempts to identify a suitable device that is not available. Furthermore, should the user attempt to recommence the dialog session at a separate computing device, network resources, power and time can be wasted repeating commands to the third party application via the automated assistant.

SUMMARY

Implementations set forth herein relate to providing deep links for transitioning dialog sessions, mediated by an assistant application, between different devices. The dialog sessions can involve a user interacting with an assistant application in order to cause a third party application to perform an action. Limiting conversations to a single device can be problematic when the third party application is attempting to provide content that cannot be presented at the device. For instance, a user can be using a first device to interact with an assistant application to control smart devices in his/her home, such as a security system, smart lighting etc. If the first device does not include a display panel, the user may not be able to view images from a security camera of the security system. Furthermore, if the assistant application and/or the third party application is not capable of adequately transferring interaction data to a second device that includes the display panel, the user may have to start the dialog session over again. In another instance, a user can be using a first device to interact with an assistant application to order shoes through a third party application. If the first device does not include a display panel, the user may not be able to view the shoes before purchase. Furthermore, as with the smart home example, if the assistant application and/or the third party application is not capable of adequately transferring interaction data to a second device that includes the display panel, the user may have to start the dialog session over again. By starting the dialog session over again at the second device, computational resources and power would have been wasted at the first device. Additionally, depending on how the first device handles the initial dialog session, actions performed by the assistant application and/ or the third party application may be irreversible, thereby inadvertently mobilizing persons (e.g., inventory managers) or causing third party devices (e.g., order fulfillment robots, powered security gates etc.) to waste energy performing particular functions.

In order to transition dialog sessions involving third party applications more efficiently, the third party application and/or the assistant application can generate links that can be transferrable between devices and/or applications. The links can include deep links with strings that can identify the third party application, an originating device, a destination device, the assistant application, a modality for content (e.g., video, text, audio, etc.), and/or any other information that can be used when transitioning a dialog session between devices. For example, a user can be interacting with an assistant application in order to access a third party application that provides streaming music videos. The user can be interacting with the assistant application through a tablet device that includes a display panel on which the user can view the music videos. The user can be searching for music videos using spoken invocation phrases that direct the assistant application to provide the third party application with search data. While searching, the user can direct the assistant application to transfer the dialog session to a standalone interactive speaker, which does not have a display panel and is equipped with an assistant interface. For instance, the user can provide the invocation phrase, "Assistant, I'd like to continue searching through my standalone interactive speaker."

In some implementations, in order to transfer the dialog session and continue searching, the assistant application can receive the transfer dialog session invocation phrase and generate a link that can be transferred to another device, such as the standalone interactive speaker, for continuing the dialog session. The link can be executable by the third party application and/or a receiving device, and include information associated with a current state of the dialog session. For example, the link generated by the assistant application can identify a device on which the dialog session originated. When the originating device is a tablet device, the link can include a portion such as, "... \origin-tablet\ ... ," in order to identify the originating device. By identifying the originating device, a context of the dialog session can be determined by the receiving device in order to adapt the dialog session accordingly. The context can refer to a modality through which the user was participating in the dialog session, such as through both audio and video. In some implementations, the link can identify a modality and/or a context of the dialog session using a portion such as, "... \video-audio\ ... ," in order to explicitly identify the modalities. Alternatively, the originating device can be identified in a schema or host portion of the link such as, for example, "originating-device.dialog-session/search-application/ ... " in order that the latter portion of the link can be used to provide logic and descriptors related to the third party application and dialog session.

When a request to transfer the dialog session is received, and the link for transferring the dialog session has been generated, the link can be transmitted to the receiving device (e.g., an assistant device such as the standalone interactive speaker). The receiving device can acknowledge the identity of the originating device and/or the context of the initial dialog session, and initialize the continuation of the dialog session at the receiving device. In some implementations, the receiving device can modify the link to identify the receiving device such as, for example, changing "... \tablet-device\ ... " to "... \assistant-device ... " in order that the third party application can acknowledge the change. Alternatively, the receiving device can modify the link to identify the change in modality such as, for example, changing "... \video-audio\ ... " to "... \audio\ ... " in order to specify the new modality for the third party application. The modified link can thereafter be provided to the third party application to continue the dialog session.

In some implementations, the third party application can be notified of the request to transfer the dialog session to a different device and, in response, generate a link for the assistant application. The assistant application at the original device can receive the link from the third party application and transfer the link to the receiving device, to which the dialog session will be transferred. Alternatively, the assistant application at the receiving device can receive the link from the third party application in order that the receiving device can continue the dialog session without having to interact with the original device. The third party application can generate links for different devices based on an application programming interface (API) that allows the third party application to be configured to communicate links in formats that the assistant application can execute on a variety of different devices.

In other implementations, the third party application and/or the assistant application can generate one or more links for transferring a dialog session before receiving a request from the user to transfer the dialog session. For instance, the user can invoke a third party application through an assistant application in order to schedule a vehicle, operated by an agent of the third party, to pick them up. Initially, the user can provide a natural language input to the assistant application through an assistant interface (e.g., a microphone) of an originating device, such as a laptop computer. The natural language input (e.g., "Assistant, please schedule a vehicle to pick me up.") can cause the assistant application to open a transit application and generate a link, which can be transferred to a receiving device, such as a cellular phone, upon request from the user. Alternatively, the link can be generated by the transit application in response to the assistant application accessing or otherwise communicating with the transit application. The link can be, for example, "laptop_computer.transit_application/schedule-vehicle-today," thereby providing an indication of the originating device (e.g., the laptop computer), the application that has been accessed (e.g., the transit application), and an action or intent (e.g., "schedule-vehicle-today").

The link generated by the assistant application and/or the third party application can be updated during the dialog session between the user and the assistant application and/or the third party application. Additionally, the link can be updated after the link has been transferred to a different device for continuing the dialog session. For instance, the initial link can identify the action that is to be performed by the third party application. During the dialog session, the initial link can be modified to include intents or other logic for completing the identified action. When the link is initially, "laptop_computer.transit_application/schedule-vehicle-today," and during the dialog session the user identifies a destination (e.g., San Carlos) for the vehicle to drive the user, the link can be updated by the assistant application and/or the third party application to be, for example, "laptop_computer.transit_application/schedule-vehicle-today/destination_sancarlos." The link can therefore incorporate slot values for the third party application and/or the assistant application to use for completing an action. In this way, latency resulting from transferring the dialog session can be minimized by continually updating one or more links in anticipation of the user requesting the dialog session be transferred to another device. In some implementations, the generation and/or modification of the links can be performed at one or more client devices, and/or one or more server devices. For instance, a server that communicates with the third party application and/or the assistant application can generate and/or modify the links. Alternatively, one or more client devices that host the third party application and/or the assistant application can generate and/or modify the links.

In some implementations, a method implemented by one or more processors is set forth as including operations such as generating, at a first client device, interaction data based on a dialog session between a user and a third party application. The dialog session can be mediated by an assistant application accessible to the first client device and a second client device, and the interaction data can identify an action that, when executed by the third party application, causes content to be provided at an interface of the first client device. The method can further include receiving, at the first client device, a natural language input for requesting that the dialog session between the user and the third party application be continued at the second client device such that the user can interact with the third party application by providing subsequent natural language input to the second client device. The method can also include causing one or more links to be generated based on the interaction data. Each link of the one or more links can be associated with a set of one or more modalities for presenting output generated by one or both of the assistant application and the third party application. The method can further include providing the one or more links to the second client device. The second client device can be configured to engage with the third party application using the one or more links and receive subsequent natural language inputs to continue the dialog session between the user and the third party application.

The interface of the first client device can be configured to provide the content according to a first modality, and the second client device can be configured to provide separate content associated with the action according to a second modality that is different than the first modality. The assistant application can cause the third party application to generate the one or more links in response to the first client device receiving the natural language input. The one or more links can include text that identifies one or more of the set of one or more modalities. The assistant application can generate the one or more links in response to receiving the natural language input requesting the dialog session be continued at the second client device, and the one or more links can identify a modality through which the content can be provided at the second client device. In some implementations, causing the one or more links to be generated can occur independently from receiving the natural language input for requesting that the dialog session between the user and the third party application be continued at the second client device. In some implementations, the method can include causing the one or more links to be modified at least based on the dialog session and prior to providing the one or more links to the second client device. Causing the one or more links to be modified can include incorporating an identifier for a modality of the interface of the first client device.

In other implementations, a method implemented by one or more processors is set forth as including operations such as generating interaction data corresponding to a dialog session between a user and an application at a first client device. The dialog session can be mediated by an automated assistant that: interacts with the application according to natural language inputs provided by the user, and is accessible to the first client device and a second client device. The method can further include receiving, from the user and at the first client device during the dialog session, a request to continue the dialog session using the second client device. The second client device can be configured to provide content from the application through a modality that can be different than a separate modality of the first client device. The method can also include causing, based on the received request to continue the dialog session using the second client device, one or more links to be generated for the second client device. The one or more links can be based on one or more natural language inputs received by the automated assistant from the user during the dialog session, and identify the modality through which the second client device is configured to provide content received from the application. The method can further include causing the automated assistant to access the link at the second client device for continuing the dialog session between the user and the application at the second client device.

In some implementations, the modality of the second client device can correspond to an audio interface or a video interface of the second client device. The one or more links can be generated at the application and can be provided to the second client device by the application. The one or more links can identify an action to be completed by the application or the automated assistant. The one or more links identify one or more slot values for completing the action.

In yet other implementations, a method implemented by one or more processors is set forth as include operations such as receiving one or more links corresponding to a dialog session between a user and an application. The dialog session can be mediated by an automated assistant that is accessible to: a first client device on which the dialog session was initiated, and a second client device at which the one or more were received. The method can also include identifying one or more parameters of the one or more links, the one or more parameters corresponding to dialog session content generated in furtherance an action to be performed by the application or the automated assistant. The method can further include providing, at the second client device, a query to a user to continue the dialog session between the user and the third party application based on the one or more parameters. The method can also include receiving, at the second client device, a response from the user, the response identifying one or more supplemental parameters configured for use in combination with the identified one or more parameters for completing the action. The method can further include causing one or more modified links to be generated based on the one or more supplemental parameters. The one or more modified links can be configured to be transferrable to a separate device for continuing the dialog session sequentially from the receiving of the response from the user.

In some implementations, the one or more parameters can correspond to at least one intent and at least one slot value for completing the action to be performed by the application or the automated assistant. The one or more modified links can identify a modality through which the application provides content to the second client device. The received one or more links identify: the action to be performed by the application or the automated assistant, and a modality of the first client device. In some implementations, the method can include providing the one or more supplemental parameters to the application in furtherance of the action, and receiving responsive content from the application. The one or more modified links can be generated further based on the responsive content from the application. The one or more modified links can identify the second client device.

DETAILED DESCRIPTION

Figure 1:
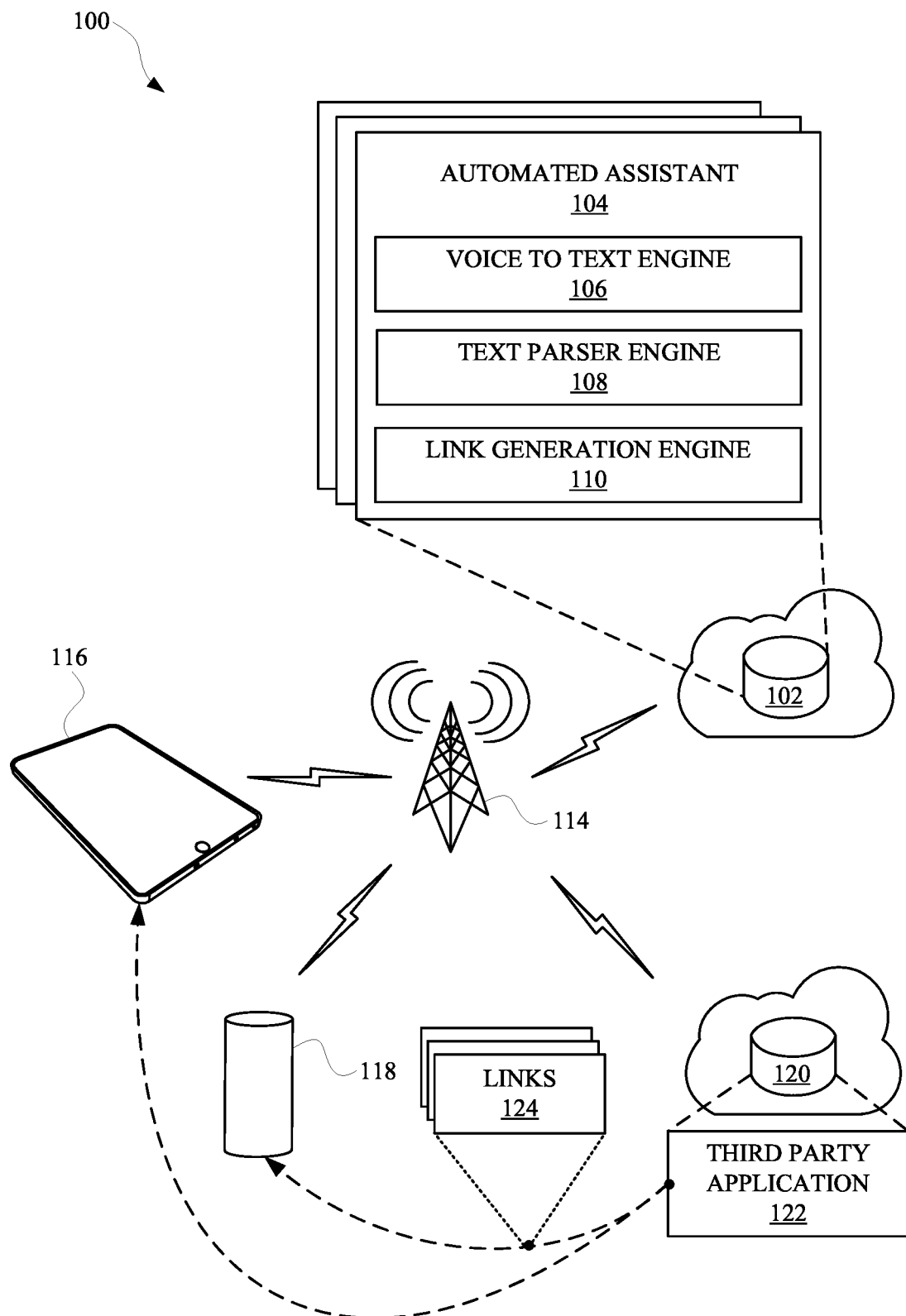
FIG. 1 illustrates a system for enabling dialog sessions, mediated by an automated assistant, to be transitioned between devices using deep linking.

FIG. 1 illustrates a system 100 for enabling dialog sessions, mediated by an automated assistant 104, to be transitioned between devices using deep linking. The automated assistant 104 can operate as part of an assistant application that is provided at one or more computing devices, such as a first client device 116 (e.g., a cellular phone), a second client device 118 (e.g., a standalone speaker device), and/or a remote computing device 102, such as a server device. A user can interact with the automated assistant 104 via an assistant interface, which can be a microphone, a camera, a touch screen display, a user interface, and/or any other apparatus capable of providing an interface between a user and an application. For instance, a user can initialize the automated assistant 104 by providing a verbal, textual, or a graphical input to the assistant interface to cause the automated assistant 104 to perform a function (e.g., provide data, control a peripheral device, access an agent, etc.). The first client device 116 can include a display device, which can be a display panel that includes a touch interface for receiving touch inputs and/or gestures for allowing a user to control applications of the first client device 116 via the touch interface. In some implementations, second client device 118 can lack a display device, thereby providing an audible user interface output, without providing a graphical user interface output. Furthermore, the second client device 118 can provide a user interface, such as a microphone, for receiving spoken natural language inputs from a user.

The first client device 116 and the second client device 118 can be in communication with the remote computing device 102 over a network 114, such as the internet. The first client device 116 and the second client device 118 can offload computational tasks to the remote computing device 102 in order to conserve computational resources at each of the first client device 116 and the second client device 118. For instance, the remote computing device 102 can host the automated assistant 104, and the first client device 116 and the second client device 118 can transmit inputs received at one or more assistant interfaces to the remote computing device 102. However, in some implementations, the automated assistant 104 can be hosted at the first client device 116 or the second client device 118. In various implementations, all or less than all aspects of the automated assistant 104 can be implemented on the first client device 116 and/or the second client device 118. In some of those implementations, aspects of the automated assistant 104 are implemented via a local assistant application of the first client device 116 or the second client device 118 and interface with the remote computing device 102 that implements other aspects of the automated assistant 104. The remote computing device 102 can optionally serve a plurality of users and their associated assistant applications via multiple threads. In implementations where all or less than all aspects of the automated assistant 104 are implemented via a local assistant application of the first client device 116 or the second client device 118, the local assistant application can be an application that is separate from an operating system of the first client device 116 or the second client device 118 (e.g., installed "on top" of the operating system)—or can alternatively be implemented directly by the operating system of the first client device 116 or the second client device 118 (e.g., considered an application of, but integral with, the operating system).

In some implementations, the remote computing device 102 can include a voice to text engine 106 that can process audio data received at an assistant interface to identify the text embodied in the audio data. The process for converting the audio data to text can include a speech recognition algorithm, which can employ neural networks, word2vec algorithms, and/or statistical models for identifying groups of audio data corresponding to words or phrases. The text converted from the audio data can parsed by a text parser engine 108 and made available to the automated assistant 104 as textual data that can be used to generate and/or identify command phrases from the user and/or a third party application 122.

In some implementations, the system 100 can allow for dialog sessions to be transferred between client devices, which can access an automated assistant 104 and/or a third party application 122. For instance, a user can initialize a dialog session with the automated assistant 104 using an assistant interface, such as a microphone, at the first client device 116. The natural language input provided to the first client device 116 can be, "Assistant, access the magazine application," which can cause the automated assistant 104 to invoke the third party application 122 (i.e., a magazine application) over the network 114 and/or at the first client device 116. In some implementations, in response to receiving the natural language input invoking the third party application 122, the automated assistant 104 can employ a link generation engine 110 to generate a link, which can be transmitted over the network 114. The link can identify the third party application 122, the automated assistant 104, the modality (e.g., audio) corresponding to the assistant interface, the first client device 116, and/or any other details that can be associated with the user invoking the automated assistant 104. For example, the link can be: "tablet-device.magazine-application/audio/start."

In some implementations, a link 124 can be generated at the third party application 122 and be provided by the third party application 122 to each of the first client device 116 and the second client device 118 in response to the initial natural language input. In this way, each client device can have the ability to take over the dialog session without waiting for the user to request the dialog session be transferred to another client device. In other implementations, the link 124 can be generated by the third party application 122 and/or the automated assistant 104 in response to the user requesting that the dialog session be transferred to another client device. For example, the user can provide a natural language input of, "Assistant, I'd like to continue through the standalone speaker device." In response, the third party application 122 and/or the automated assistant 104 can generate a link 124 for transferring to the second client device 118 in order that the dialog session can be continued at the second client device 118.

In some implementations, a transfer of the dialog session can be inferred from a natural language input. Details such as the destination for the dialog session can be inferred from a proximity of the user to a particular device, a location of the user, contextual data corresponding to the transfer of the dialog session, persons located near the user during the dialog session, other persons involved in the dialog session, an application being accessed during the dialog session, and/or any other data that can be used to infer a name of a desired device for continuing a dialog session. For example, the user can be exploring the magazine application with the automated assistant 104 being the mediator between the user and the magazine application (i.e., the third party application 122). Subsequently, a sibling of the user can ask to borrow the first client device 116 in order to perform other functions with the first client device 116 that do not involve the magazine application (e.g., playing a game). In order to continue interacting with the magazine application through another device, the user can provide, to the first client device 116, a natural language input such as, "Assistant, my sibling is going to borrow the tablet device."

In response to the user indicating that another person is going to be using the tablet computing device (i.e., the first client device 116), the automated assistant 104 can identify another client device that can take over the dialog session. This saves the user from having to request the transfer of the dialog session. For example, the automated assistant 104 can identify a network, to which the first client device 116 is connected, is a home Wi-Fi network, and that the second client device 118 is also connected to the home Wi-Fi network. Based on this correlation between the first client device 116 and the second client device 118, the automated assistant 104 or the third party application 122 can generate a link 124, which can identify the second client device 118 as the device on which the dialog session will be continued. Alternatively, the automated assistant 104 can acknowledge the natural language input and determine that the second client device 118 is the next proximate device to the user. Therefore, in response to determining that the second client device 118 is the next closest client device to the user, the automated assistant 104 or the third party application 122 can generate a link 124 for the second client device 118 to receive for continuing the dialog session.

When the second client device 118 receives the link 124, or otherwise processes the link 124, the link 124 can be parsed in order to determine how to continue the dialog session at the second client device 118. For instance, when the link 124 includes content such as, "tablet-device.magazine-application/search/," the second client device 118 can operate under the assumption that the user was previously receiving audio and video content from the magazine application, since the tablet device can provide both audio and video content. Specifically, the automated assistant 104 can compare the identifier "tablet-device" to a table that correlates devices to various modalities in order to determine the modalities that are available at the device to which the dialog session is being transferred. The automated assistant 104 can, in response, coordinate with the third party application 122 to cause the third party application 122 to provide content corresponding to the modality of the destination device. For instance, when the dialog session associated with the magazine application is being transferred from the first client device 116 to the second client device 118, the third party application 122 can receive an indication from the automated assistant 104 that the second client device 118 only includes an audio modality. Therefore, content provided by the third party application 122 can be limited to audio data, thereby conserving network bandwidth that would otherwise be consumed by providing audio and video data over the network 114. By allowing dialog sessions to be transferred in this way, a user will not have to specifically coordinate devices for continuing dialog sessions.

Figure 2:
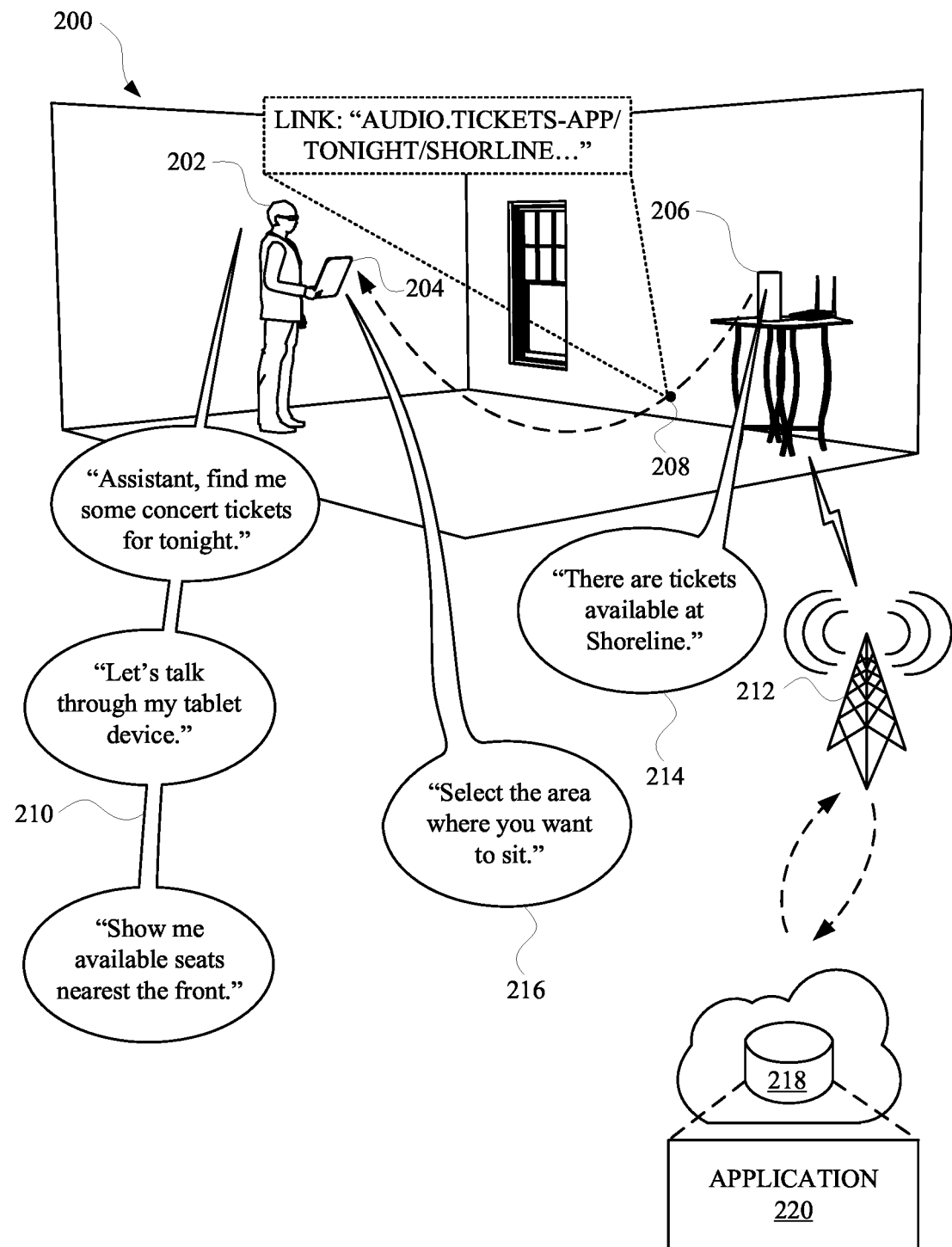
FIG. 2 illustrates a perspective view of a user causing a dialogue session to be transitioned from a first client device to a second client device.

FIG. 2 illustrates a perspective view 200 of a user causing a dialogue session to be transitioned from a first client device to a second client device. The first client device 206 can be a standalone client device that can communicate to a user through a modality such as a speaker and microphone combination. The first client device 206 can receive natural language input from the user and convert the natural language input into commands that can be processed by an automated assistant and or any other application that is available to the first client device 206. The automated assistant can be an application that is installed on the first client device 206, a second client device 204, a remote computing device, and/or any other computing device capable of hosting at least part of an automated assistant application. For example, the first client device 206 can include an assistant interface, such as a microphone, which can be used to communicate commands from the user 200, over a network 212, and to a server which can process the commands from the user. In some implementations, the automated assistant can act to mediate a dialogue session between the user and an application 220 that is hosted at a remote computing device 218. For example, the application 220 can be an event application from which a user can order tickets for concerts. The user 202 can communicate with the automated assistant in order to perform functions at the application 220. For instance, the user 202 can provide natural language input that includes a command such as, "Assistant, find me some concert tickets for tonight," in order to initialize a dialogue session that will ultimately result in an action of ordering concert tickets.

In response to the natural language input 210 from the user, the automated assistant can provide a response from the first client device 206 such as, "There are tickets available at Shoreline." The automated assistant can provide the response based on an interaction between the automated assistant and the application 220. Specifically, the automated assistant can use a command generated from the natural language input 210 from the user to query the application 220 regarding concert tickets that are available that night. In response to the query from the automated assistant, the application 220 can provide details about a concert such as, for example, a concert that is occurring at Shoreline Amphitheatre. The automated assistant can use the information about the concert to generate the response 214 as part of the dialogue session. In some implementations, the application 220 and/or the automated assistant can generate a link that reflects a status of the dialog session, in order that latency from transferring the dialog session can be mitigated by generating a link ahead of a request to transfer. The link can include slot values (e.g., "shoreline," "tonight") that can be used for completing the action or intent of ordering tickets. In this way, any device or application that receives the link will be able to determine the status of the ordering action and the slot values that have been identified during the ordering process thus far. Upon transferring the link, the link can be modified, by the automated assistant or application, to include supplemental slot values and/or parameters in furtherance of completing the action.

During the dialogue session, the user 202 can provide a subsequent natural language input 210 requesting that the dialogue session be transferred to the second client device 204. For example, the user 202 can provide the natural language input 210 of "Let's talk through my tablet device." The automated assistant can receive the natural language input 210 from the user 202 and cause a link 208 to be generated. The link 208 can be generated at the first client device 206, and/or the remote computing device 218 and transmitted to the first client device 206 or the second client device 204. The link 208 can include information corresponding to the dialog session between the user 202, the automated assistant, and the application 220. For example, because the user 202 has already requested that they want to order tickets for a concert tonight, the link 208 can include identifiers for the action of ordering tickets (e.g., tickets), and a slot value for a date of the concert (e.g., tonight). Furthermore, the link 208 can also include information corresponding to one or more responses 214 provided by the automated assistant and/or the application 220. Information corresponding to the responses 214 can include an identifier "Shoreline," indicating a search result that has been most recently provided to the user 202 during the dialog session. Optionally, the link 208 can identify a modality through which the user 202 and the automated assistant, or the application 220, were communicating. For instance, the link 208 can be "audio.tickets-app/tonight/shoreline . . . ," thereby indicating the modality through which the user 202 was receiving responses from the application 220. In some implementations, the link 208 can identify a modality through which the second client device 204 can communicate with the user 202. For example, the link 208 can be "audio-video.tickets-app/tonight/shoreline . . . ," thereby indicating a desired modality available at the second client device 204 that is the subject of the transfer request from the user 202.

In response to receiving the link 208, the second client device 204 can process the link 208 in order to allow the dialog session between the user 202 and the application 220 at the second client device 204. For instance, the link 208 can be transmitted from the first client device 206 to the second client device 204, which can provide data to the application 220 for continuing the ticket ordering process. The application 220 can acknowledge the transfer between devices and provide subsequent data according to a modality available at the second client device 204. For example, when the next step in the ticket ordering process is selecting the location of the seats for the concert, the application 220 can transmit visual data that allows the user to visualize the concert venue. The automated assistant can cause the visual data to be visually presented at the selected client device, along with an audio response 216 of, "Select the area where you want to sit." The user 202 can thereafter provide a response to the automated assistant via an assistant interface of the second client device 204. The assistant interface of the second client device 204 can be a touch display panel that can receive touch inputs for selecting graphical icons at the second client device 204. For instance, the application 220 can cause a mapping of the concert venue to appear at the second client device 204 and the user 202 can touch the area of the mapping for which the user 202 would like to order tickets. Alternatively, the user 202 can provide a natural language input to another assistant interface of the second client device 204, such as a microphone. The natural language input 210 can be, for example, "Show me available seats nearest the front." In response, the application 220 can cause the automated assistant to present graphics representing seats nearest the front of the concert venue. In this way, the user 202 has transitioned the dialog session from the first client device 206 to the second client device 204 without having to repeat inputs to the automated assistant, thereby saving computational resources at each of the devices involved in the dialog session.

Figure 3:
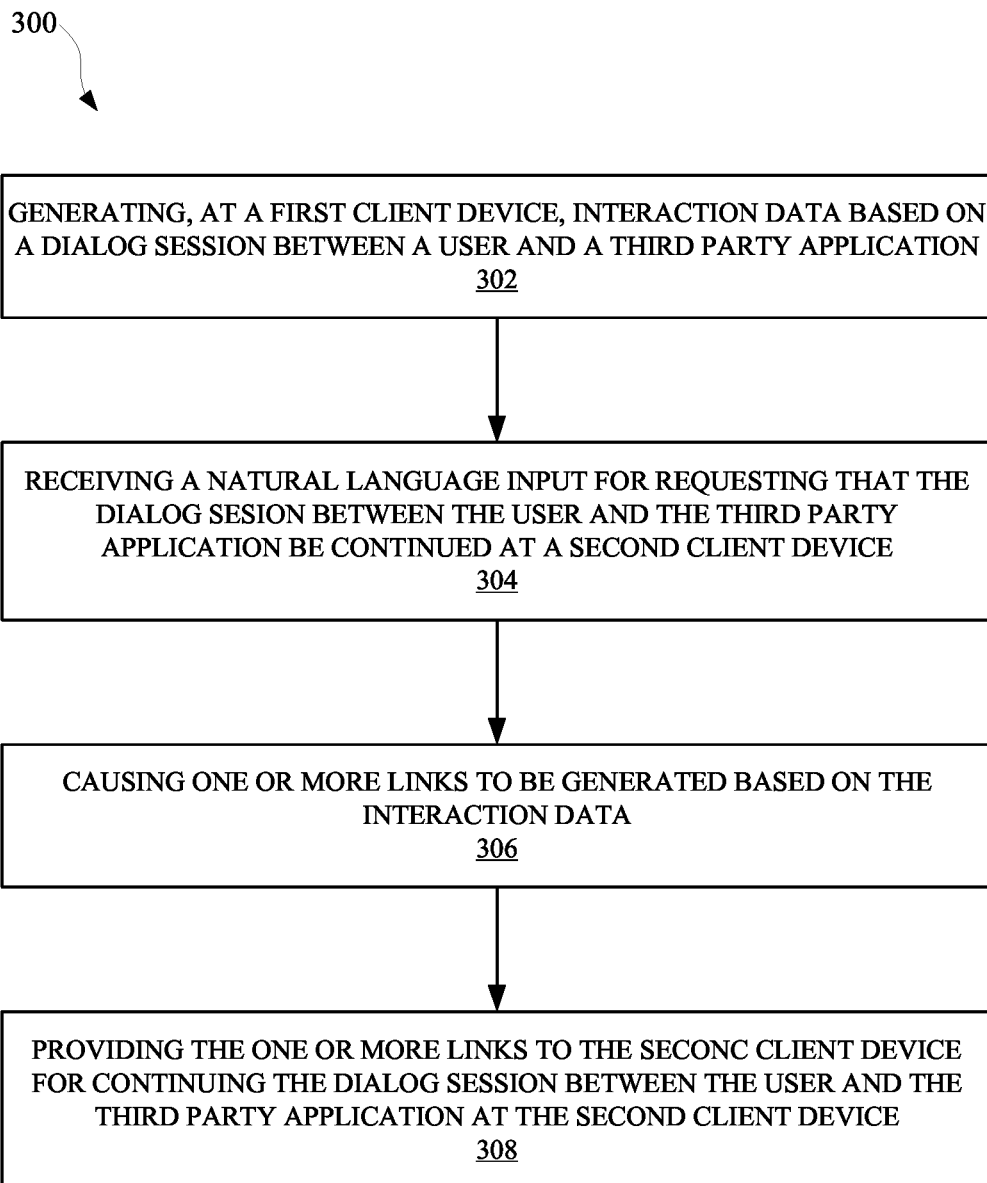
FIG. 3 illustrates a method for transferring a dialog session that is between a user and a third party application.

FIG. 3 illustrates a method 300 for transferring a dialog session that is between a user and a third party application. The method 300 can be performed by one or more computing devices and/or server devices, and/or any other apparatus capable of communicating with other computing devices. The method 300 can include an operation 302 of generating, at a first client device, interaction data based on a dialog session between a user and a third party application. The dialog session can be mediated by an assistant application accessible to the first client device and a second client device. Furthermore, the interaction data can identify an action that, when executed by the third party application, causes content to be provided at an interface of the first client device. The assistant application can be accessible through an assistant interface provided at each of the first client device and the second client device. The third party application can be an application that is made by an entity that is different than an entity that is providing the assistant application. Alternatively, in some implementations, the third party application can be made by the same entity as the entity providing the assistant application.

The method 300 can also include an operation 304 of receiving a natural language input for requesting that the dialog session between the user and the third party application be continued at the second client device. The user can request that the dialog session be transferred in order to continue an interaction with the third party application using natural language input that will be subsequently received at the assistant interface of the second client device. For example, when the first client device is a standalone speaker device and the second client device is a tablet client device, the natural language input can be, "Assistant, let's continue talking at the tablet device." In this way, the user is able to continue a dialogue session with a separate client device that may have different modalities for interacting with the third-party application. For instance, the first client device can have an audio-only modality and the second client device can have both an audio and a video modality.

The method 300 can further include an operation 306 of causing one or more links to be generated based on the interaction data. The one or more links can be configured to effectuate the transfer of the dialogue session from the first client device to the second client device. The one more links can identify information for transferring the dialogue session, such as dialogue content, identifiers for the first client device and/or the second client device, an identifier for the user, an identifier for the third party application, an identifier for the action to be completed by the third party application, identifiers for other users and/or applications to be contacted during the dialogue session, and/or any other information that can assist in transferring the dialogue session from the first client device to the second line device. In some implementations, one or more links can be generated at the third party application and thereafter transmitted to the first client device and/or the second client device.

The method 300 can further include an operation 308 of providing the one or more links to the second client device for continuing the dialogue session between the user and the third party application at the second client device. The third party application can refer to an application that is installed at multiple different kind client devices and/or accessible to a server that hosts the third party application. Therefore, information associated with the third party application can be accessible to the first client device, the second client device, and/or any other device that has permission to access the server on which the third party application and/or the third party application data is hosted. When the one or more links are provided to the second client device, the second client device can identify the third party application with which the user was communicating with, a status of the dialogue session between the user and the third party application, an action to be performed at the request of the user, slot values for performing the action(s), required slot values to be subsequently received and/or requested from the user, and/or any other information that can be useful for transferring a dialogue session between client devices.

Figure 4:
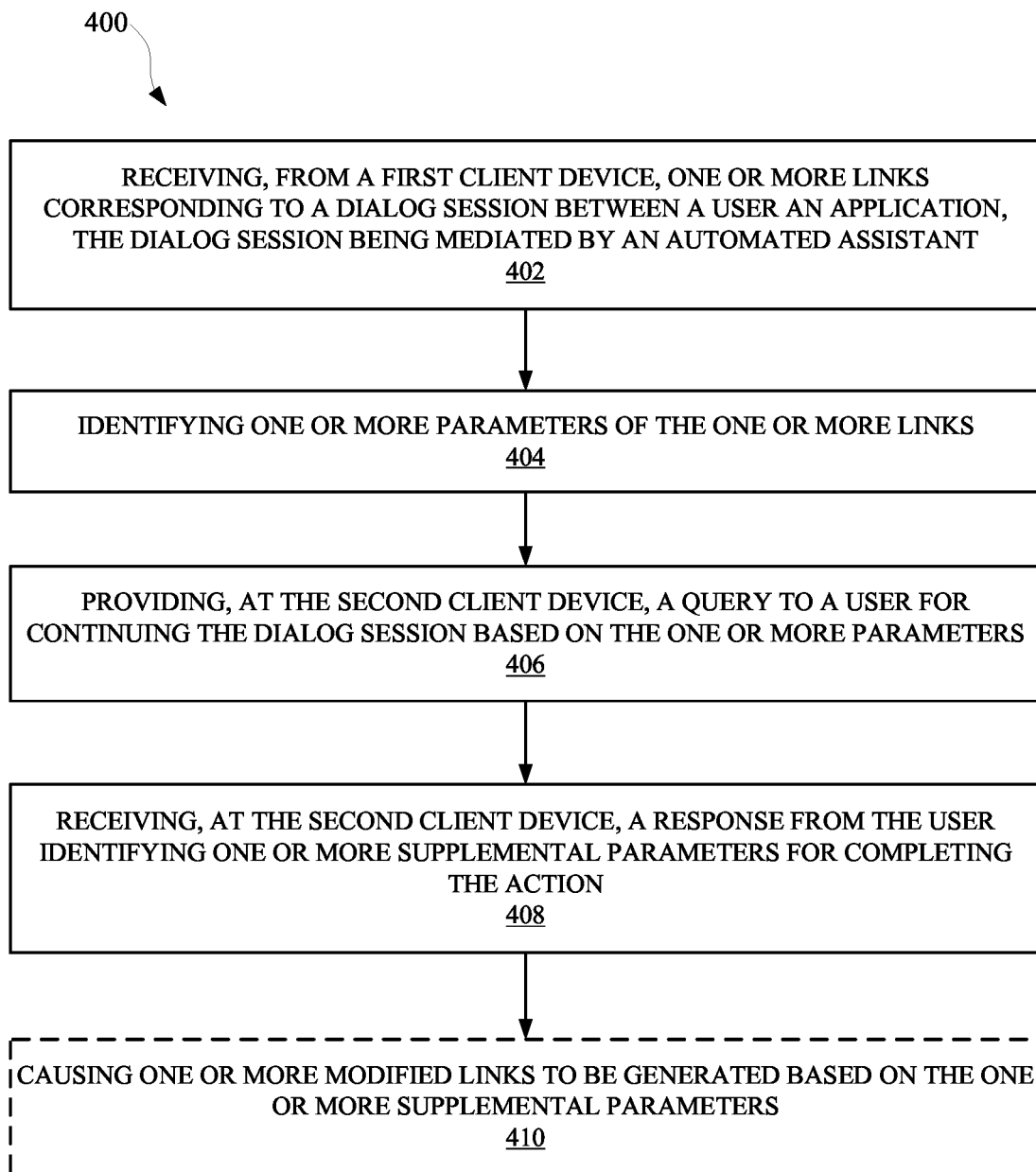
FIG. 4 illustrates a method for modifying one or more links for transferring a dialog session between client devices.

FIG. 4 illustrates a method 400 for modifying one or more links for transferring a dialog session between client devices. The method 400 can be performed by one or more computing devices, one or more server devices, and/or any other apparatus capable of communicating with an assistant application. The method 400 can include an operation 402 for receiving, from a first client device, one or more links corresponding to a dialogue session between a user and an application. The dialogue session can be mediated by an automated assistant, which can be an application that is hosted at the first client device, a second client device, a server device, and/or any other device that is accessible through a network. The user can communicate with the assistant application through an assistant interface, such as a microphone, of the first client device. The dialogue session can correspond to an interaction between the user and the application, which can be, for example, an application for navigating the internet. Therefore, the one or more links received from the first client device can include information related to actions, such as searching, to navigate the internet.

The method 400 can also include an operation 404 of identifying one or more parameters of the one or more links. The one or more parameters can refer to slot values, intents, actions, addresses, and/or any other content that can be embodied in a link. For example, at least one link of the one or more links can include a status of an action being performed by the application associated with the one or more links. The action can be a search action for identifying content through the application and/or the internet. The one or more parameters can correspond to slot values and/or any other parameters that can be used for completing the action or intent of the user. For instance, the one or more parameters can include search terms, folder names, processes, account names, and/or any other information that can be used by an application. For example, the one or more parameters can identify a modality, such as audio, through which the first client device was providing content from the application. The audio can embody search results that have been identified by the application during the dialogue session between the user and the application. For example, the user can be searching for a movie to rent using a movie streaming application and the audio provided during the dialogue session can correspond to movie titles for the user to select from.

The method 400 can further include an operation 406 of providing, at the second client device, a query to a user for continuing the dialog session based on the one or more parameters. For instance, when the one or more parameters of the one or more links provided to the second client device identify a search that was performed by the application, the query generated by the second client device can include a request to select a search result. For example, the one or more parameters of the one or more links can identify search terms that were used by the application to perform a search for movies. The second client device can provide the search terms to the application and receive search results from the application in response. The second client device, or the assistant application, can provide the search results to the user through a modality of the second client device. When the second client device includes audio and video modalities, the search results can be displayed at a display panel of the second client device, and audio corresponding to movie titles identified in the search results can be provided from speakers at the second client device. A query can be provided with the search results specifically requesting the user to select a search result by identifying a search result at the display panel or providing a natural language input that identifies a search result.

The method 400 can also include an operation 408 of receiving, at the second client device, a response from the user identifying one or more supplemental parameters that allow the application to complete the action. For example, the one or more supplemental parameters can include an identifier for a search result previously provided as an output at the second client device. In response, the application can identify content corresponding to the search result and provide, to the second client device, the content for viewing by the user. In this way, by transitioning to a different client device that includes a different modality, the user is able to continue performing a function with an application without having to restart a dialogue session. This can conserve power, network bandwidth, and/or conserve computational resources by limiting an amount of natural language input that must be reprocessed in order to reach a particular point in a dialogue session.

Optionally, the method 400 can include an operation 410 of causing one or more modified links to be generated based on the one or more supplemental parameters. A modified link can include some amount of information provided in the received one or more links, as well as information received subsequent to the receipt of the one or more links. This can allow the user to subsequently transfer the dialogue session to another device, or temporarily pause the dialogue session until a later time. For example, because the user selected the search result previously provided by the application, the one or more links can be modified to identify the search result that was selected and/or the action taken by the user to select the search result. The one or more modified links can, for example, include text such as "second-client-device.application/search/selection_movie-name." In this way, should the user decide to transfer the dialogue session to another device, such as a television, the automated assistant operating at the television can identify the selection of the movie. The user can then continue the dialogue session at the television and, for example, play the movie at the television. This allows the user to complete the intended action of identifying a movie to stream, without having to repeat previously provided commands or natural language inputs.

Figure 5:
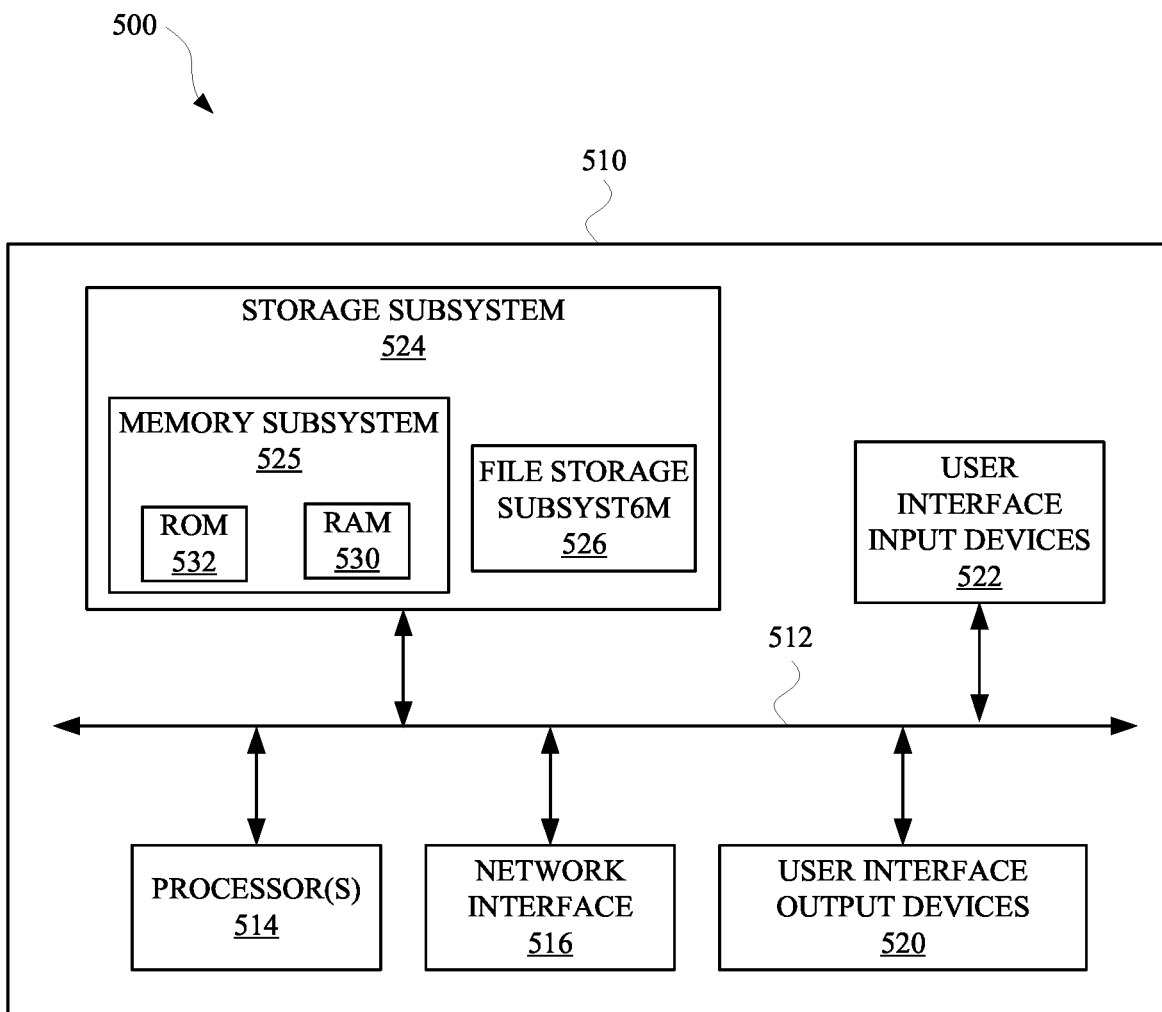
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, method 400, and/or to implement one or more of automated assistant 104, first client device 116, second client device 118, third party application 122, first client device 206, second client device 204, remote computing device 218, and/or application 220.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    generating, at a first client device, interaction data based on a dialog session between a user and a third party application, wherein:
        the dialog session is mediated by a machine learning model accessible to the first client device and a second client device, and
        the interaction data identifies an action, that when executed by the third party application, causes selectable content to be provided at an interface of the first client device;
    receiving, at the first client device, a natural language input for requesting that the dialog session between the user and the third party application be continued at the second client device such that the user can interact with the third party application by providing subsequent natural language input to the second client device;
    causing one or more links to be generated based on the interaction data, wherein each link of the one or more links is associated with at least a graphical modality and an audio modality for presenting output generated by the third party application; and
    providing the one or more links to the second client device, wherein the second client device is configured to engage with the third party application using the one or more links and receive subsequent natural language inputs to continue the dialog session between the user and the third party application.

2. The method of claim 1, wherein the machine learning model causes the third party application to generate the one or more links in response to the first client device receiving natural language input.

3. The method of claim 1, wherein the machine learning model generates the one or more links in response to receiving the natural language input requesting the dialog session be continued at the second client device, and the one or more links identify the selectable content to be provided at the second client device.

4. The method of claim 1, wherein causing the one or more links to be generated occurs independently from receiving the natural language input for requesting that the dialog session between the user and the third party application be continued at the second client device.

5. The method of claim 1, wherein, in engaging with the third party application using the one or more links, the second client device:
    causes an instance of the third party application to be initiated at the second client device.

6. A non-transitory computer readable storage medium configured to store instructions that, when executed by one or more processors, cause the one or more processors to perform operations that include:
    generating, at a first client device, interaction data based on a dialog session between a user and a third party application, wherein:
        the dialog session is mediated by a machine learning model accessible to the first client device and a second client device, and
        the interaction data identifies an action, that when executed by the third party application, causes selectable content to be provided at an interface of the first client device;
    receiving, at the first client device, a natural language input for requesting that the dialog session between the user and the third party application be continued at the second client device such that the user can interact with the third party application by providing subsequent natural language input to the second client device;
    causing one or more links to be generated based on the interaction data, wherein each link of the one or more links is associated with at least a graphical modality and an audio modality for presenting output generated by the third party application; and
    providing the one or more links to the second client device, wherein the second client device is configured to engage with the third party application using the one or more links and receive subsequent natural language inputs to continue the dialog session between the user and the third party application.

7. The non-transitory computer readable storage medium of claim 6, wherein the machine learning model causes the third party application to generate the one or more links in response to the first client device receiving natural language input.

8. The non-transitory computer readable storage medium of claim 6, wherein the machine learning model generates the more or one links in response to receiving the natural language input requesting the dialog session be continued at the second client device, and the one or more links identify the selectable content to be provided at the second client device.

9. The non-transitory computer readable storage medium of claim 6, wherein causing the one or more links to be generated occurs independently from receiving the natural language input for requesting that the dialog session between the user and the third party application be continued at the second client device.

10. The non-transitory computer readable storage medium of claim 6, wherein, in engaging with the third party application using the one or more links, the second client device:

causes an instance of the third party application to be initiated at the second client device.

11. A system comprising:

one or more processors; and memory configured to store instructions that, when executed by the one or more processors cause the one or more processors to perform operations that include:

generating, at a first client device, interaction data based on a dialog session between a user and a third party application, wherein:

the dialog session is mediated by a machine learning model accessible to the first client device and a second client device, and the interaction data identifies an action, that when executed by the third party application, causes selectable content to be provided at an interface of the first client device;

receiving, at the first client device, a natural language input for requesting that the dialog session between the user and the third party application be continued at the second client device such that the user can interact with the third party application by providing subsequent natural language input to the second client device;

causing one or more links to be generated based on the interaction data, wherein each link of the one or more links is associated with at least a graphical modality and an audio modality for presenting output generated by the third party application; and providing the one or more links to the second client device, wherein the second client device is configured to engage with the third party application using the one or more links and receive subsequent natural language inputs to continue the dialog session between the user and the third party application.

12. The system of claim 11, wherein the machine learning model causes the third party application to generate the one or more links in response to the first client device receiving natural language input.

13. The system of claim 11, wherein the machine learning model generates the one or more links in response to receiving the natural language input requesting the dialog session be continued at the second client device, and the one or more links identify the selectable content to be provided at the second client device.

14. The system of claim 11, wherein causing the one or more links to be generated occurs independently from receiving the natural language input for requesting that the dialog session between the user and the third party application be continued at the second client device.

15. The system of claim 11, wherein, in engaging with the third party application using the one or more links, the second client device:

causes an instance of the third party application to be initiated at the second client device.

* * * * *